United States Patent
Caisse et al.

(10) Patent No.: US 12,182,603 B2
(45) Date of Patent: Dec. 31, 2024

(54) AUTOMATED ANALYSIS AND DYNAMIC RESOURCE CONFIGURATION FOR HARD PROVISIONED VIRTUAL MACHINES

(71) Applicant: Dell Products L.P., Round Rock, TX (US)

(72) Inventors: Joseph B. Caisse, Burlington, MA (US); Bradley K. Goodman, Nashua, NH (US); Himabindu Tummala, South Grafton, MA (US)

(73) Assignee: Dell Products L.P., Round Rock, TX (US)

( * ) Notice: Subject to any disclaimer, the term of this patent is extended or adjusted under 35 U.S.C. 154(b) by 512 days.

(21) Appl. No.: 17/725,350

(22) Filed: Apr. 20, 2022

(65) Prior Publication Data

US 2023/0342170 A1 Oct. 26, 2023

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01)

(58) Field of Classification Search
CPC .. G06F 9/45558; G06F 9/5077; G06F 9/5005; G06F 2009/45579; G06F 2009/45583; G06F 2209/5019
See application file for complete search history.

(56) References Cited

U.S. PATENT DOCUMENTS

| | | | | |
|---|---|---|---|---|
| 2014/0089917 A1* | 3/2014 | Attalla | ........... | G06F 9/5083 718/1 |
| 2015/0309828 A1* | 10/2015 | Shaik | ........... | G06F 9/5083 718/1 |
| 2017/0206103 A1* | 7/2017 | Arndt | ........... | G06F 9/45533 |
| 2017/0366606 A1* | 12/2017 | Ben-Shaul | ........... | G06F 3/061 |
| 2019/0303203 A1* | 10/2019 | Guan | ........... | G06F 9/5077 |
| 2022/0197767 A1* | 6/2022 | Szczepanik | ........... | G06F 11/301 |

* cited by examiner

*Primary Examiner* — Sisley N Kim
(74) *Attorney, Agent, or Firm* — Womble Bond Dickinson (US) LLP

(57) ABSTRACT

Methods and systems for managing provisioning of virtual machines. Virtual machines may host applications that may provide computer implemented services. Various hardware resources may be allocated to the virtual machines via a hypervisor. As the workloads of the applications change, the virtual machines may become over or under provisioned. To manage provisioning of virtual machines, various types of resource consumption estimates may be obtained. The resource consumption estimates may be used to ascertain how to provision various virtual machines to reduce or eliminate inefficient allocations of hardware resources for use by the virtual machines.

20 Claims, 11 Drawing Sheets

AUTOMATED ANALYSIS AND DYNAMIC RESOURCE CONFIGURATION FOR HARD PROVISIONED VIRTUAL MACHINES

FIELD OF THE DISCLOSED EMBODIMENTS

Embodiments disclosed herein relate generally to resource management. More particularly, embodiments disclosed herein relate to systems and methods for efficient resource allocation.

BACKGROUND

Computing devices may store data and used stored data. For example, computing devices may utilize data when providing computer implemented services. The ability of computing devices to perform different types of computer implemented services may depend on the types and quantities of available computing resources.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
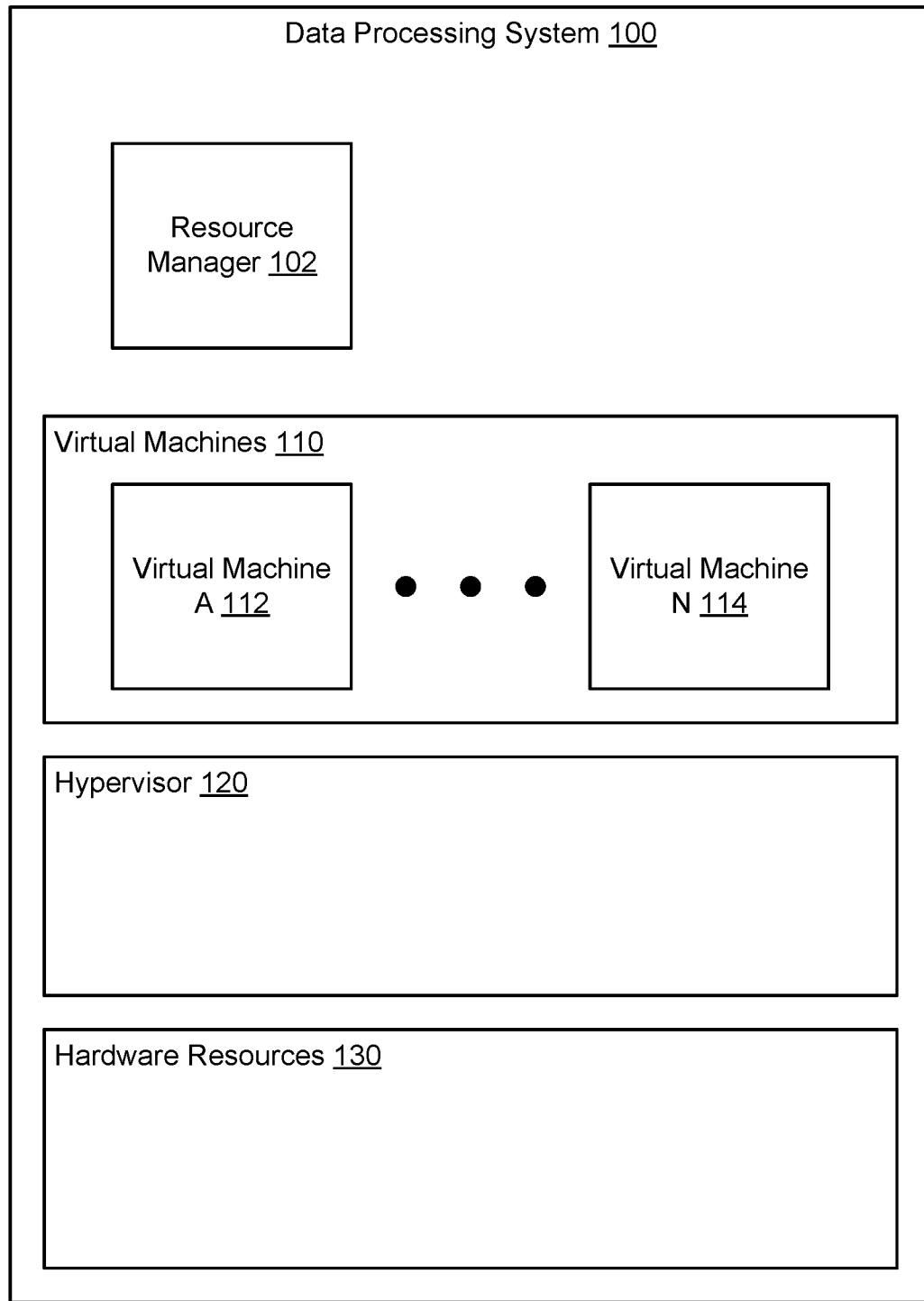
FIG. 1 shows a block diagram illustrating a data processing system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing provisioning of virtual machines. Virtual machines may host applications that may provide computer implemented services. Various hardware resources may be allocated to the virtual machines via a hypervisor. As the workloads of the applications change, the virtual machines may become over or under provisioned which may impact the quality of computer implemented services provided by the virtual machines (e.g., due to under provisioning) or other virtual machines (e.g., due to lack of allocable resources due to over provisioning of other virtual machines that do not efficiently utilize the provisioned resources).

To manage provisioning of virtual machines, various types of resource consumption estimates may be obtained. At least one of the resource consumption estimates may discriminate between consumption of resources for productive and unproductive purposes. The resource consumption estimate may ignore computing resources utilized for unproductive purposes thereby providing a more accurate estimate of the resources necessary for the virtual machine to operate nominally.

The resource consumption estimates may be used to ascertain how to provision various virtual machines to reduce or eliminate inefficient allocations of hardware resources for use by the virtual machines. Once the provisioning is determined, the virtual machines may be provisioned accordingly.

By doing so, embodiments disclosed herein may facilitate the dynamic allocation of resources to various types of virtual machines, including hard provisioned virtual machines. Consequently, the efficiency of use of limited hardware resources may be improved.

In an embodiment, a computer-implemented method for managing resources allocated to virtual machines is provided. The method may include obtaining a first resource consumption estimate for a hard provisioned virtual machine of the virtual machines, the first resource consumption estimate being obtained from a hypervisor that manages resource provisioning for the hard provisioned virtual machine; obtaining a second resource consumption estimate for a hard provisioned virtual machine of the virtual machines, the second resource consumption estimate being obtained from an agent hosted by the hard provisioned virtual machine; identifying: a resource inefficiency for the hard provisioned virtual machine based on the first resource consumption estimate and the second resource consumption estimate, and a new resource allocation based on the resource inefficiency; and remediating the identified resource inefficiency using the new resource allocation.

Obtaining the second resource consumption estimate may include obtaining workload characteristics of workloads performed by the hard provisioned virtual machines; classifying the workloads based on the workload characteristics;

calculating a reduction factor based on the workload classifications; and reducing a quantity of computing resources alleged to be used by the hard provisioned virtual machine by the reduction factor to obtain the second resource consumption estimate.

The workloads may be classified based on a productivity level of the workloads.

The productivity level of each of the workloads may be based on a ratio of polling behavior by a respective workload and non-polling behavior by the respective workload.

The polling behavior may correspond to acts of the workload inquiring regarding whether actions should be performed by the hard provisioned virtual machine.

Identifying the resource inefficiency may include making a determination that the first resource consumption estimate and the second resource consumption estimate are different; based on the determination: identifying a first provisional resource inefficiency based on the first resource consumption estimate, and identifying a second provisional resource inefficiency based on the second resource consumption estimate; and obtaining the resource inefficiency using the first provisional resource inefficiency and the second provisional resource inefficiency.

Remediating the identified resource inefficiency may include making a determination that the first resource consumption estimate and the second resource consumption estimate are different; and based on the determination: requesting authorization to modify a resource allocation for the hard provisioned virtual machine based on the new resource allocation.

Remediating the identified resource inefficiency may include making a determination that the first resource consumption estimate and the second resource consumption estimate are similar; and based on the determination: provisioning the hard provisioned virtual machine based on the new resource allocation.

The virtual machines may be hosted by a data processing system, and the virtual machines comprise a soft provisioned virtual machine which utilizes, at least in part, shared resources of the data processing system, and the hard provisioned virtual machine has exclusive use of a portion of resources of the data processing system.

The first resource consumption estimate may be based on resources consumed by the hard provisioned virtual machine for any action, and the second resource consumption estimate is based on resources consumed by the hard provisioned virtual machine for only productive actions.

In an embodiment, a computer-implemented method for managing resources allocated to virtual machines is provided. The method may include obtaining a resource consumption estimate for a hard provisioned virtual machine of the virtual machines; identifying: a resource inefficiency for the hard provisioned virtual machine based on the resource consumption estimate, and a new resource allocation based on the resource inefficiency; and remediating the identified resource inefficiency using the new resource allocation.

Identifying the resource inefficiency may include comparing the resource consumption estimate to an existing resource allocation for the hard provision virtual machine to identify a resource delta; making a determination that the resource delta exceeds a threshold; and identifying the new resource allocation based on the determination.

The resource consumption estimate may include a processing estimate and a memory estimate, and the existing resource allocation include a quantity of processing resources and a quantity of memory resources.

Comparing the resource consumption estimate to the existing resource allocation may include making a first sub-comparison between the processing estimate and the quantity of processing resources to identify a processing resource delta; making a second sub-comparison between the memory estimate and the quantity of memory resources to identify a memory resource delta; and aggregating the processing resource delta and the memory resource delta to obtain the resource delta.

Identifying the new resource allocation may include incrementing one of the quantity of processing resources and the quantity of the memory resources to obtain a provisional resource allocation; identifying a quantity of allocable resources based, at least in part, on a reserved quantity of resources for dynamic allocation; making a second determination, based on the allocable resources, that the provisional resource allocation will not over provision a host data processing system for the virtual machines; and promoting the provisional resource allocation to the new resource allocation.

Obtaining the resource consumption estimate for the hard provisioned virtual machine of the virtual machines may include obtaining resource consumption samples for the hard provisioned virtual machines until a threshold number of samples are obtained, the threshold number of samples being based on a duration of time and a sampling rate of the resource consumption samples; and calculating an average of the resource consumption samples to obtain the resource consumption estimate.

The virtual machines may be hosted by a data processing system, and the virtual machines comprise a soft provisioned virtual machine which utilizes, at least in part, shared resources of the data processing system, and the hard provisioned virtual machine exclusively uses a portion of resources of the data processing system.

Remediating the identified resource inefficiency using the new resource allocation may include provisioning resources of a data processing system for exclusive use by the hard provisioned virtual machine based on the new resource allocation, scheduling provisioning of resources of a data processing system for exclusive use by the hard provisioned virtual machine based on the new resource allocation, and/or modifying resources of a data processing system for exclusive use by the hard provisioned virtual machine while the hard provisioned virtual machine continues execution.

A non-transitory media may include instructions that when executed by a processor cause any of the computer-implemented methods to be performed.

A data processing system may include the non-transitory media and a processor, and may perform any of the computer-implemented methods when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to data processing system 100.

Data processing system 100 may provide computer implemented services to users and/or other computing devices operably connected to data processing system 100 thereby completing workloads. The computer implemented services may include any type and quantity of services including, for example, database services, instant messaging services, video conferencing services, etc. Different systems may provide similar and/or different computer implemented services.

To provide the computer implemented services, data processing systems 100 may include hardware resources 130. Hardware resources 130 may include any quantity and type of hardware device usable to contribute computing resources (e.g., processing resources, memory resources, storage resources, etc.) usable to provide the computer implemented services. For example, hardware resources 130 may include processors, memory devices, storage devices, communication devices, and/or other types of hardware devices.

The hardware resources 130 may be used by applications hosted by data processing system 100 that provide the computer implemented services. To facilitate shared use of hardware resources 130, data processing system 100 may employ virtualization. Virtualization may be process through which resources may be provisioned to any number of entities.

To facilitate virtualization of hardware resources 130, data processing system 100 may include hypervisor 120 and/or any number of virtual machines 110. Hypervisor 120 may manage provisioning of hardware resources 130 to virtual machines 110. In an embodiment, hypervisor provisions hardware resources 130 to virtual machines 110 through sharing (e.g., time-sliced use) of hardware resources 130 among the virtual machines and/or dedication of portions of hardware resources 130 for exclusive use by virtual machines. A virtual machine provisioned with exclusive use of hardware resources may be referred to a hard provisioned virtual machine, and a virtual machine provisioned with shared hardware resources may be referred to as a soft provisioned virtual machine.

For example, to share some of hardware resources 130, hypervisor 120 may provide time-sliced access to some of the hardware resources 130. During the time-sliced access, some of the virtual machines may have access/use of some of hardware resources 130 while other virtual machines may not have access/use of those hardware resources. Hypervisor 120 may do so through any means.

However, time-sliced access to hardware resources 130 may present challenges for certain use cases. For example, if a computer implemented service requires real-time responses, then time-sliced access may prevent the computer implemented service from being provided (e.g., a response may be required at a point in time while a virtual machine hosting an application that provides the computer implemented services does not have hardware resource access).

To address similar and/or other scenarios, hypervisor 120 may also dedicate portions of hardware resources 130 to dedicated use by virtual machines. By doing so, the virtual machines, and application hosted thereby, may always have access to hardware resources necessary for them to provide computer implemented services.

Virtual machines 110 may emulate a computing device using the computing resources provisioned to them. Data processing system 100 may include any number of virtual machines (e.g., 112-114). Any of virtual machines 110 may host any number of applications and, thereby, may provide any type and quantity of computer implemented services.

Overtime, the quantity of resources used by applications hosted by virtual machines 110 may change over time. Consequently, if a certain quantity of hardware resources 130 is provisioned to a virtual machine at a first point in time, the virtual machine may be over provisioned (e.g., not utilize the provisioned hardware resources) or under provisioned (e.g., lack access to sufficient hardware resources to provide their functions in a nominal manner) at other points in time.

For example, consider a scenario in which virtual machine A 112 hosts a database used for storing information regarding commercial transactions. During a workday, large numbers of transactions may be recorded in the database thereby resulting in a large workload being placed on virtual machine A 112. However, at night when commercial transaction volume decreases, fewer numbers of transactions may be recorded in the database thereby resulting in a light workload being placed on virtual machine A 112.

In general, embodiments disclosed herein relate to systems, methods, and devices for managing hardware resources provisioned to virtual machines. To manage the hardware resources provisioned to virtual machines, data processing system 100 may include resources manager.

Resources manager 102 may obtain one or more resource consumption estimates may be obtained. The resource consumption estimates may be obtained from hypervisor 120 and/or agents hosted by the virtual machines. The resource consumption estimates may be obtained using different manners of estimating the computing resource consumption rates of virtual machines 110, and/or applications hosted by the virtual machines. Consequently, the resource consumption estimates may indicate similar and/or different consumption rates by virtue of the different methods employed in measuring the resource consumption rates.

In an embodiment, hypervisor 120 may perform a process for obtaining resource consumption estimates that may not reflect the quantity of computing resources necessary for a virtual machine to execute nominally. For example, hypervisor 120 may simply identify a consumption rate of computing resources by the virtual machine and use the obtained rate as the resource consumption estimate.

In an embodiment, an agent hosted by a virtual machine may perform a process for obtaining resource consumption estimates that may reflect the quantity of computing resources necessary for a virtual machine to execute nominally. To do so, the agent may monitor how consumed computing resources are used by the virtual machine and classify portions of the consumed computing resources as either productive uses or unproductive uses. The agent may base its resource consumption estimate only on the consumed computing resources classified as being a productive use. Consequently, the agent may apply a reduction factor (e.g., ratio of productive use classified computing resources to total computing resources) to reduce the total quantity of computing resources consumed by a virtual machine to obtain its resource consumption estimates. Accordingly, the resource consumption estimates obtained from agents may indicate that fewer resources are being consumed by virtual machines when compared with corresponding resource consumption estimates from hypervisor 120.

Resource manager 102 may use the resource consumption estimates to ascertain whether any of the virtual machines are over or under provisioned. For example, the resource consumption rates estimates may be compared to quantities of provisioned resources and/or thresholds to make the determination.

When resource manager 102 determines that one of virtual machines 110 is over or under provisioned, it may take action to remediate the situation. For example, resource manager 102 may modify (e.g., through hypervisor 120) the quantity of hardware resources provisioned to a virtual machine, schedule future modifications, notify administrators of the situation, and/or perform other actions that may reduce the impact of over or under provisioning on the operation of data processing system. When doing so, data processing system 100 may select the actions performed based, at least in part, on the level of disagreement or agreement of the resource consumption estimates. For example, resource manager 102 may select actions that are less likely to result in immediate changes to the operation of data processing system 100 in scenarios where the resource consumption estimates are in disagreement, so that additional information may be obtained to further guide decisions and/or other entities (e.g., administrators, other management systems) may provide input on the course of action to address the situation.

By doing so, resources manager 102 may provide improved computer implemented services by improving the likelihood that virtual machines are provisioned with quantities of hardware resources 130 proportional to their respective needs, even for hard provisioned virtual machines for which accurate resource consumption estimates may not be available directly from hypervisor 120. For example, resource manager 102 may dynamically and/or responsively provision virtual machines 110 to limit over and under provisioning, when possible based on the hardware resources available for allocation.

Data processing system 100 may be implemented using a data processing system (e.g., a computing device) such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding data processing systems, refer to FIG. 5.

In an embodiment, one or more of resource manager 102, virtual machines 110, hypervisor 120, and hardware resources 130 is implemented using a hardware device including circuitry. The hardware device may be, for example, a digital signal processor, a field programmable gate array, or an application specific integrated circuit. The circuitry may be adapted to cause the hardware device to perform the functionality of resource manager 102, virtual machines 110, hypervisor 120, or hardware resources 130. Resource manager 102, virtual machines 110, hypervisor 120, or hardware resources 130 may be implemented using other types of hardware devices without departing embodiment disclosed herein.

In one embodiment, one or more of resource manager 102, virtual machines 110, hypervisor 120, and hardware resources 130 is implemented using a processor adapted to execute computing code stored on a persistent storage that when executed by the processor performs the functionality of resource manager 102, virtual machines 110, hypervisor 120, or hardware resources 130 discussed throughout this application. The processor may be a hardware processor including circuitry such as, for example, a central processing unit, a processing core, or a microcontroller. The processor may be other types of hardware devices for processing information without departing embodiment disclosed herein.

One or more of resource manager 102, virtual machines 110, hypervisor 120, and hardware resources 130 may perform all, or a portion, of the methods illustrated in FIGS. 3A-3D.

While illustrated in FIG. 1 as included a limited number of specific components, a data processing system in accordance with an embodiment may include fewer, additional, and/or different components than those illustrated therein.

Figure 2A:
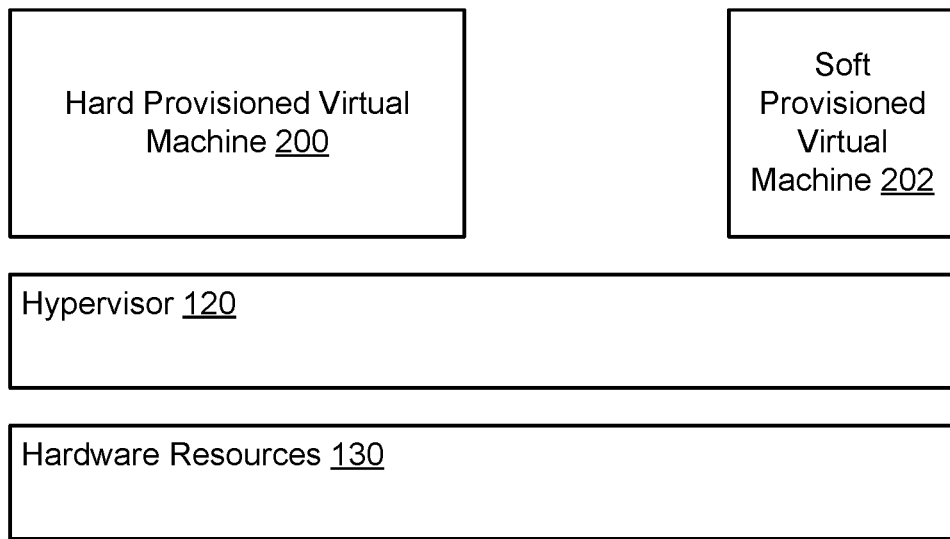
FIG. 2A shows a block diagram illustrating types of virtual machines in accordance with an embodiment.
Figure 2B:
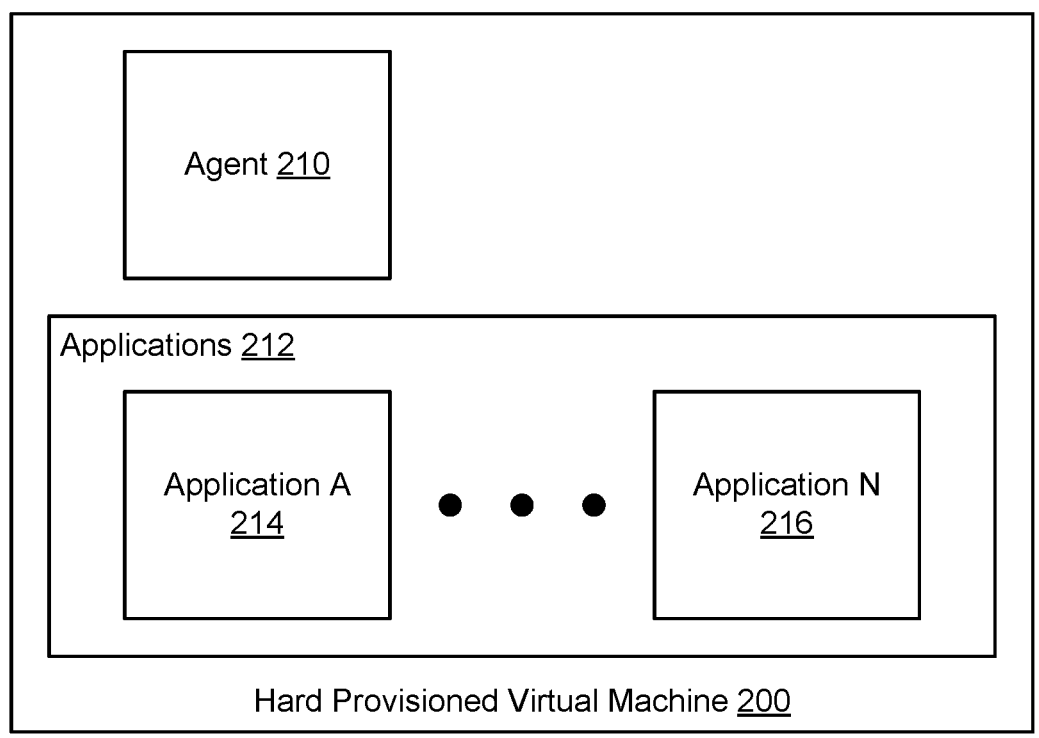
FIG. 2B shows a block diagram illustrating a hard provisioned virtual machine in accordance with an embodiment.
Figure 2C:
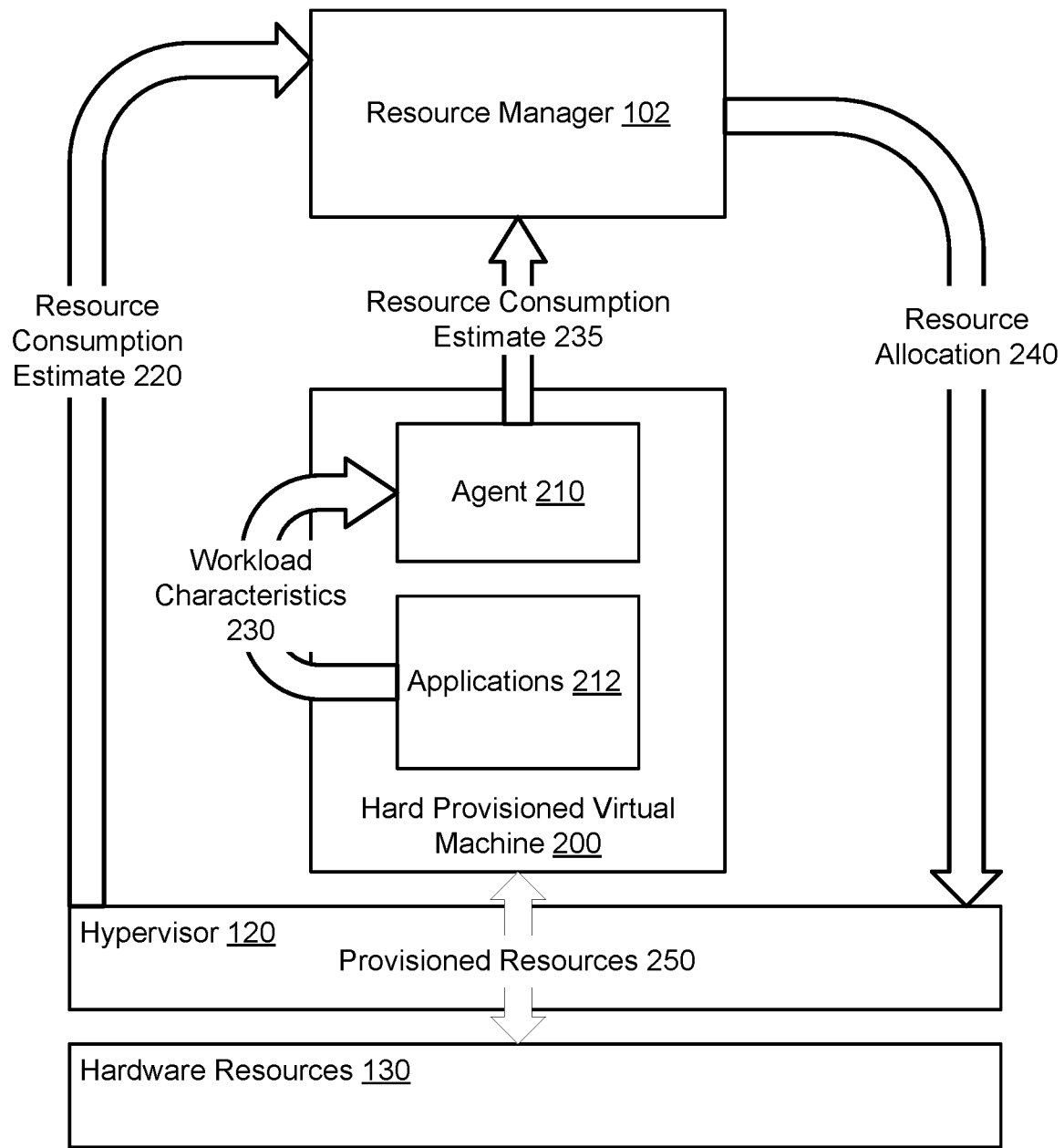
FIG. 2C shows a block diagram illustrating data flow in accordance with an embodiment.

As discussed above, data processing system may utilize virtual machines as part of its operation. FIGS. 2A-2C show diagrams of virtual machines and use of the virtual machines in accordance with an embodiment disclosed herein.

Turning to FIG. 2A, a block diagram of two virtual machines (e.g., 200, 202) in accordance with an embodiment is shown.

Hard provisioned virtual machine 200 may be provisioned with portions of hardware resources 130 dedicated to its exclusive use (e.g., not shared via time-slicing with other virtual machines). For example, to provide hard provisioned virtual machine 200 with processing resources, a core of a processor of hardware resources 130 may be allocated to hard provisioned virtual machine 200. Other portions of hardware resources 130 may be similarly allocated to hard provisioned virtual machine 200 (e.g., not shared via time-slicing).

In contrast, soft provisioned virtual machine 202 may be provisioned with portions of hardware resources 130 via time-sliced access. For example, any number of other virtual machines (e.g., other soft provisioned virtual machines) and software provisioned virtual machines 202 may each be allocated a certain duration of time during which they have exclusive access to some of hardware resources 130, and no access during the other periods of time when other soft provisioned virtual machines have exclusive access.

Hypervisor 102 may facilitate both hard provisioning and soft provisioning of hardware resources 130 to virtual machines. Generally, hypervisor 102 may dynamically allocate resources to soft provisioned virtual machines. However, hypervisor 102 may not be authorized to provision (e.g., remove add) hardware resources for hard provisioned virtual machines (e.g., since hypervisor 120 may not have visibility into the reasons why certain provisioning decisions are made).

Turning to FIG. 2B, a block diagram of hard provisioned virtual machine 200 in accordance with an embodiment is shown. As discussed above, virtual machines 110 (hard and soft provisioned) may host any number and type of applications 212 to provide computer implemented services, to complete workloads, etc.

In an embodiment, at least one of applications 212 is adapted to poll or perform other functions while an active workload is not being performed. Polling may refer to a behavior of checking to see if a workload is ready to be performed. Performing a workload and polling behaviors may both consume computing resources. From the perspective of hypervisor 120, there may be no difference in the consumption of computing resources for these two behaviors. However, if the quantity of hardware resources provisioned to hard provisioned virtual machine 200 is modified (e.g., reduced or increased), it may not impact workload completion. Rather, reduced or increased polling behavior may simply be performed when less or more computing resources are available.

Agent 210 may generate (or sent information usable to generate) resource consumption estimates for hard provisioned virtual machine 200 that takes into account productive and unproductive behaviors of hard provisioned virtual machine 200. Productive behaviors may include any actions that lead to workload completion. Unproductive behaviors may include actions related to polling behavior, or other actions that do not contribute toward workload completion.

To identify productive and unproductive behavior, agent 210 may monitor the actions performed (e.g., workload characteristics) by applications 212, classify the actions (e.g., as productive or unproductive), and sum the computing resources used for the actions in each classification. The summed consumed computing resources associated with the classification may be used to identify (i) the computing resources consumed for productive uses, (ii) ratios of computing resources consumed for unproductive uses to all uses, and/or other characterizations regarding the use of computing resources by the applications. Agent 210 may utilize the identified information to generate (or provide information usable to generate) a resource consumption estimate for hard provisioned virtual machine 200 that reflects computing resources consumed for productive uses. In contrast, hypervisor 120, by virtue of its limited view of the operation of hard provisioned virtual machine 200, may provide resource consumption estimates that reflect both productive and unproductive uses.

Turning to FIG. 2C, a diagram of hard provisioned virtual machine 200 interacting with resource manager 102 in accordance with an embodiment is shown. As discussed above, resource manager 102 may manage provisioning of resources for hard provisioned virtual machine 200.

To do so, resource manager 102 may (i) deploy agent 210, (ii) obtain resource consumption estimates 220, 230 from hypervisor 120 and agent 210, and (iii) decide on a resource allocation 240 for hard provisioned virtual machine 200.

To obtain resource allocation 240, it may be required that certain quantities of resource consumption estimates be obtained, various threshold for identifying whether hard provisioned virtual machine 200 is over provisioned may be utilized, and various increments in changes to provisioned hardware resource may be utilized. Such information may be stored in a repository (not shown) accessible to resource manager 102 and may include one or more of:

A frequency requirement. The frequency requirement may indicate how frequently resource consumption rates of hard provisioned virtual machine 200 are to be sampled to obtain resource consumption estimate 220, 235.

A duration requirement. The duration requirement may indicate that resource consumption estimates for a period of time may be required for inefficiencies to be identified.

Any number of conditions such as thresholds, ranges, etc. usable to delineate when hardware resources have been inefficiently allocated to hard provisioned virtual machine 200. The conditions may include, (i) an upper and a lower processing limit and (ii) an upper and lower memory limit. The upper and lower processing limit may indicate upper and lower thresholds, respectively, for processing resource utilization that if exceeded indicate inefficiency. The upper and lower memory limit may indicate upper and lower thresholds, respectively, for memory resource utilization that if exceeded indicate inefficiency. These thresholds may be percentage base such as, for example, 90%-95% (e.g., of allocated) for upper thresholds and 20-30% (e.g., of allocated) for lower thresholds.

A processing resource modification increment. The processing resource modification increment may define a quantity of hardware resources that contribute processing computing resources that are to be allocated to or away from hard provisioned virtual machine 200 when the upper or lower processing limit is exceeded.

A memory resource modification increment. The memory resource modification increment may define a quantity of hardware resources that contribute memory computing resources that are to be allocated to or away from hard provisioned virtual machine 200 when the upper or lower memory limit is exceeded.

A reserve processing resource. The reserve processing resource may specify a quantity of hardware resources that contribute processing resources that are to be reserved and not allocated to hard provisioned virtual machine 200.

A reserve memory resource. The reserve memory resource may specify a quantity of hardware resources that contribute memory resources that are to be reserved and not allocated to hard provisioned virtual machine 200.

Any of processing resource modification increment, memory resource modification increment, reserve processing resource, and reserve memory resource may be implemented with discrete quantities of hardware resources rather than percentage based quantities to facilitate appropriate hard provisioning analysis and modification.

In additional to the aforementioned information, the repository (not shown) may also include information regarding how resource manager 102 is to respond to identified inefficiencies. For example, the repository may include policies that define actions to be carried out (e.g., such as generate and implement resource allocation 240) when inefficiencies are identified and/or other factors occur. The policies may include: (i) immediate policies that cause hard provisioned virtual machine 200 to powered down and power back up after it is provisioned based on resource allocation 240, (ii) delayed policies that cause hard provisioned virtual machine 200 to be provisioned during the next time it is rebooted/stopped and/or when hypervisor 120 enters a maintenance mode, (iii) hotplug policies that cause hypervisor 120 to provision hard provisioned virtual machine 200 based on resource allocation 240 without bringing down the virtual machine, and/or (iv) report policies that cause no action to provision hard provisioned virtual machine 200 to be provisioned but may instead notify administrators of the situation and/or schedule provisioning in the future based on resource allocation 240 subject to revocation/changing by the administrators.

Hypervisor 120 may, based on resource allocation 240, modify the provisioned resources 250 to hard provisioned virtual machine 200 by increasing or decreasing the portion of hardware resources 130 exclusively allocated for use by hard provisioned virtual machine 200.

Agent 210 may monitor applications 212 to obtain workload characteristics 230 performed by applications 212. Workload characteristics 230 may include, for example, lists of actions performed by the applications, identities of the applications, and/or other information usable to classify computing resources consumed by applications 212 for productive and unproductive uses. Resource consumption estimate 235 may be based on workload characteristics 230, and may include, for example, a quantity, rate of consumption, or other characterization of the computing resources use by hard provisioned virtual machine 200 for productive uses. In contrast, resource consumption estimate 220 may be based on all consumed resources by hard provisioned virtual machine 200, and may include, for example, a quantity, rate of consumption, or other characterization of the computing resources use by hard provisioned virtual machine 200 for all uses (e.g., both productive uses and unproductive uses).

In an embodiment, agent 210 may not be deployed or may not be deployable. In such scenarios, resource manager 102 may only take into account resource consumption estimate 220 when obtaining resource allocation 240.

As discussed above, the components of FIG. 1 may perform various methods to provision virtual machines. FIGS. 3A-3D illustrates examples of methods that may be performed by the components of FIG. 1 to provision virtual machines. In the diagrams discussed below and shown in FIGS. 3A-3D, any of the operations may be repeated, performed in different orders, and/or performed in a parallel with other operations and/or a partially overlapping in time manner with other operations.

Figure 3A:
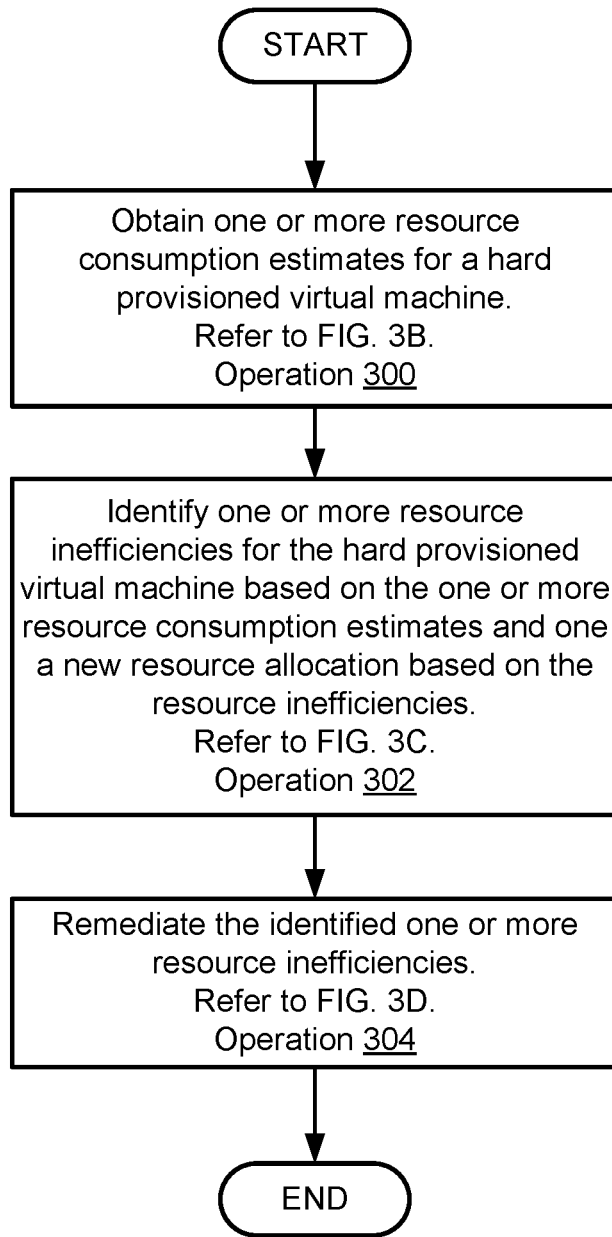
FIG. 3A shows a flow diagram illustrating a method of managing resource allocation in accordance with an embodiment.

Turning to FIG. 3A, a flow diagram illustrating a method of generating metadata blocks in accordance with an embodiment is shown. The method may be performed by a data processing system, portions thereof, or another entity.

At operation 300, one or more resource consumption estimates for a hard provisioned virtual machines are obtained. The resource consumption estimates for the hard provisioned virtual machines may be obtained from a hypervisor and/or an agent hosted by the hard provisioned virtual machine. If multiple resource consumption estimates are obtained, the estimates may be similar or different.

Figure 3B:
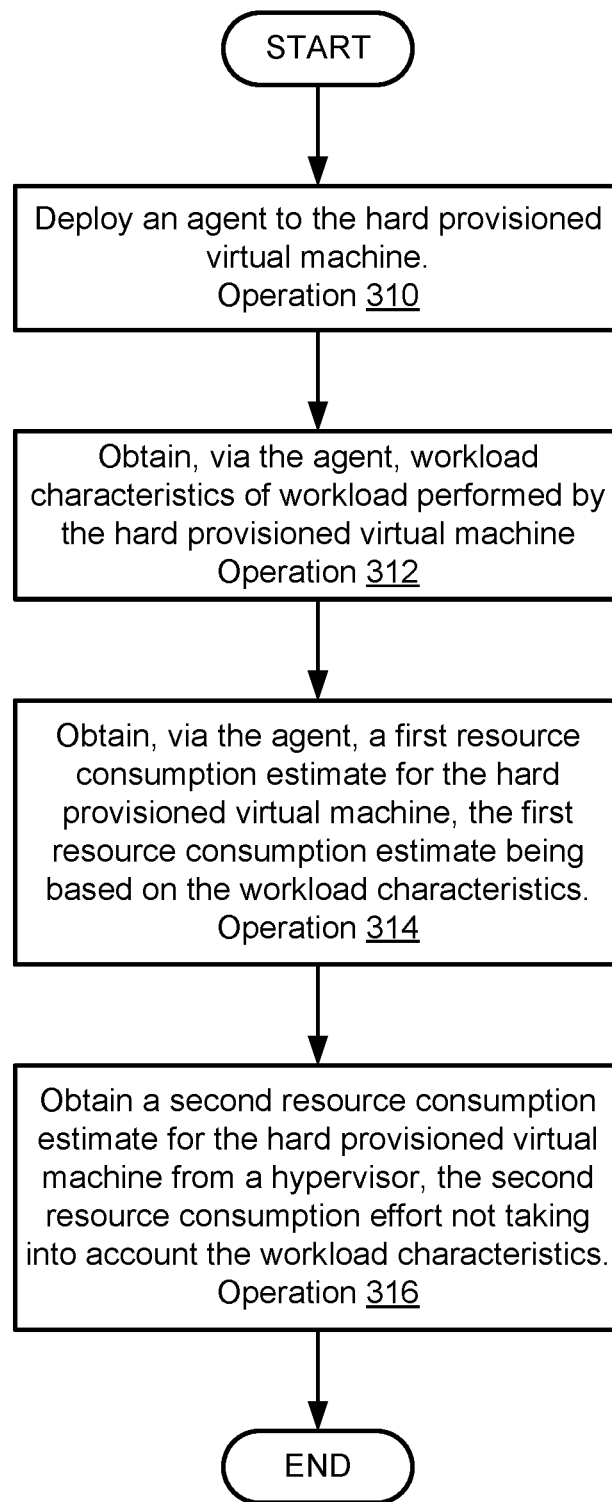
FIG. 3B shows a flow diagram illustrating a method of obtaining resource consumption estimates in accordance with an embodiment.

In an embodiment, one or more resource consumption estimates are obtained using the method illustrated in FIG. 3B. The one or more resource consumption estimates may be obtained via other methods without departing from embodiments disclosed herein.

At operation 302, one or more resource inefficiencies for the hard provisioned virtual machine is identified based on the one or more resource consumption estimates and one new resource allocation is obtained based on the one or more resource inefficiencies. The resource inefficiencies and new resource allocation may be obtained by analyzing the resource consumption estimates.

In an embodiment, the resource inefficiencies are obtained using conditions (e.g., thresholds) that if met indicate the presence of a resource inefficiency.

In an embodiment, the new resource allocation is obtained by incrementing or decrementing hardware resources allocated to the hard provisioned virtual machine. For example, the current hardware resource allocation for the hard provisioned virtual machine may be used as a basis, and hardware resources may be incremented or decremented from this basis.

Figure 3C:
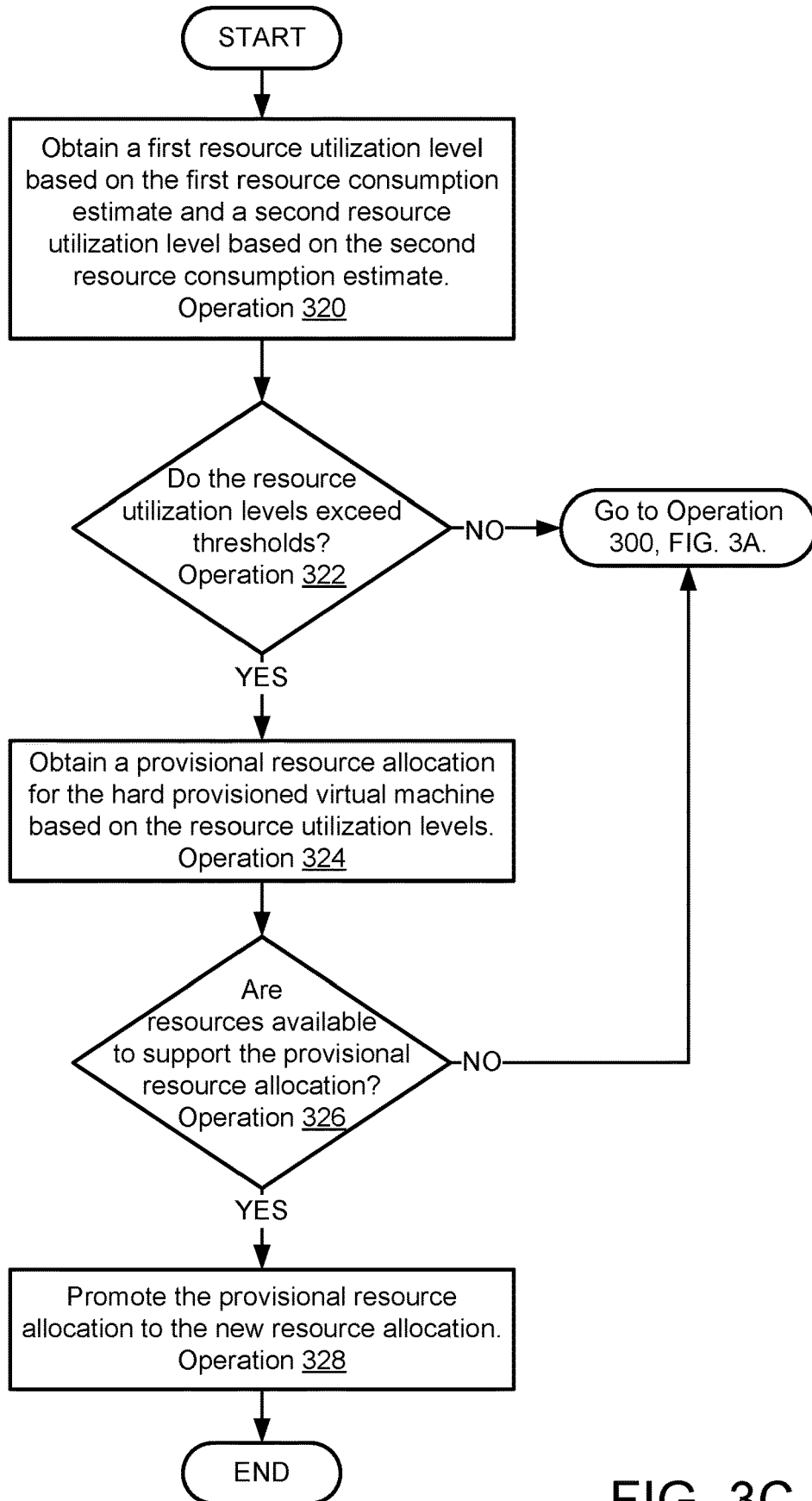
FIG. 3C shows a flow diagram illustrating a method of identifying allocation inefficiencies in accordance with an embodiment.

In an embodiment, the one or more resource inefficiencies for the hard provisioned virtual machine is identified based on the one or more resource consumption estimates and one new resource allocation is obtained based on the one or more resource inefficiencies using the method illustrated in FIG. 3C. Other methods may be utilized without departing from embodiments disclosed herein.

At operation 304, the identified one or more resource inefficiencies are remediated. The resource inefficiencies may be remediated by performing one or more actions (e.g., an action set). The actions may be selected depending on the resource inefficiencies, agreement or disagreement between the resource consumption estimates, and/or other factors.

Figure 3D:
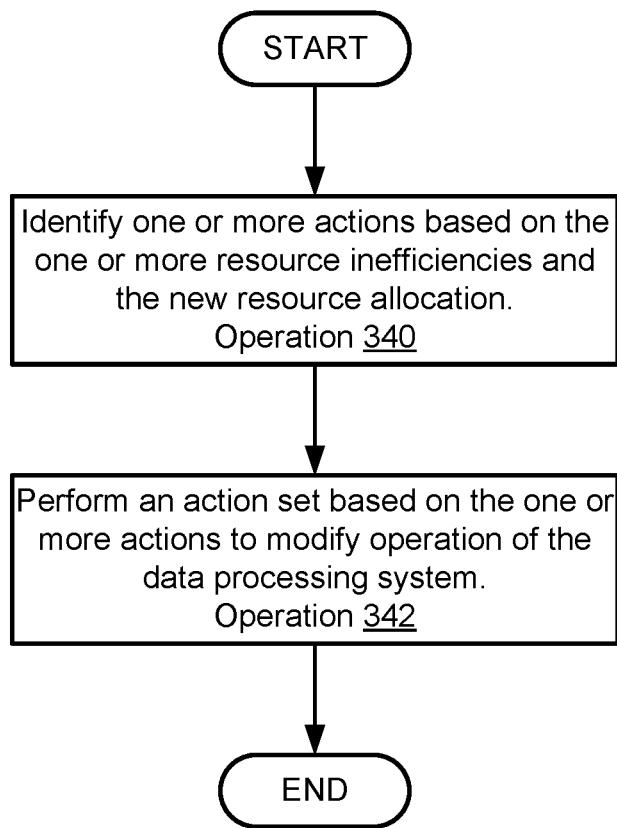
FIG. 3D shows a flow diagram illustrating a method of inefficiency remediation through resource allocation in accordance with an embodiment.

In an embodiment, the one or more resource inefficiencies are remediated using the method illustrated in FIG. 3D. The one or more resource inefficiencies may be remediated using other methods.

The method may end following operation 304.

Using the method illustrated in FIG. 3A, embodiments disclosed herein may facilitate dynamic and/or automated provisioning of hard provisioned virtual machines to reduce over and under provisioning.

Turning to FIG. 3A, a flow diagram illustrating a method of obtaining resource consumption estimates in accordance with an embodiment is shown. The method may be performed by a data processing system, portions thereof, or another entity.

At operation 310, an agent is deployed to the hard provisioned virtual machine. The agent may be deployed by instantiating an instance of the agent on the hard provisioned virtual machine.

At operation 312, workload characteristics of the workload performed by the hard provisioned virtual machine are obtained. The workload characteristics may be obtained via the agent. For example, the agent may monitor (e.g., directly or through other entities such as an operating system) operation of the applications hosted by the hard provisioned virtual machines and/or computing resources consumed for the operation. The agent may relay the workload characteristics and/or information derived from the workload characteristics to the resource manager.

At operation 314, a first resource consumption estimate for the hard provisioned virtual machine is obtained. The first resource consumption estimate may be based on the workload characteristics.

In an embodiment, the resource consumption estimate is obtained by classifying the workloads, or portions thereof, that are hosted by the hard provisioned virtual machines based on the workload characteristics. The classifications may be used to calculate a reduction factor such as a ration of computing resource consumed for productive workloads divided by all resources consumed. The first resource consumption estimate may be obtained by reducing a quantity of computing resources alleged to be used by the hard provisioned virtual machine by the reduction factor to obtain the resource consumption estimate.

The workloads may be classified based on a productivity level of the workloads. For example, a grading scale or other rubric (e.g., such as a lookup table usable to classify different actions/activity/workloads) may be used to classify different actions being performed to determine whether the workloads, or portions thereof, are productive (e.g., accomplishing a task) or unproductive (e.g., checking to see if a new task is available). The productivity level of each of the workloads may be based on a ratio of polling behavior by a respective workload and non-polling behavior by the respective workload. The polling behavior may correspond to acts of the workload inquiring regarding whether actions should be performed by the hard provisioned virtual machine rather than performing acts to complete assigned tasks.

At operation 316, a second resource consumption estimate for the hard provisioned virtual machine is obtained from a hypervisor. The second resource consumption estimate may not take into account the workload characteristics. Consequently, the second resource consumption estimate may reflect all computing resources used by a virtual machine. In contrast, the first resource consumption estimate may only reflect computing resource consumption for productive workloads.

The second resource consumption estimate may be obtained by requesting it from the hypervisor.

The method may end following operation 316.

Following operation 316, the method may be repeated until a sufficient quantity of information for a prescribed duration of time and sampled at a prescribed rate is obtained.

Using the method illustrated, resource consumption estimates that reflect both productive and total computing resource consumption may be obtained. By doing so, provisioning decisions may be made that may improve the efficiency of hardware resources may be made and enforced.

Turning to FIG. 3C, a flow diagram illustrating a method of identifying inefficiencies and resource consumption estimates in accordance with an embodiment is shown. The method may be performed by a data processing system, portions thereof, or another entity.

At operation 320, a first resource utilization level is obtained based on the first resource consumption estimate and a second resource utilization level based on the second resource consumption estimate is obtained. The resource utilization levels may be obtained by dividing the resource consumption estimates into portions associated with different types of computing resources. The resource utilizations may indicate the quantities of each type of consumed computing resource.

At operation 322, a determination is made regarding whether the resource utilization levels exceed thresholds. Exceeding a threshold may indicate (e.g., result in identification of) an inefficiency.

In an embodiment, resource inefficiencies are identified by comparing the resource consumption estimates or resource utilization levels to an existing resource allocation for the hard provision virtual machine to identify a resource delta. The delta (or resource consumption estimates themselves) may be compared to corresponding thresholds that define limits. If the limits are exceeded, then a resource inefficiency may be identified.

The resource consumption estimates or utilization levels may include a processing estimate and a memory estimate. The existing resource allocation may also include a quantity of processing resources and a quantity of memory resources, which may be similar to or different from the resource consumption estimates. The existing resource allocation may indirectly indicate the allocated quantity of processing resources and a quantity of memory resources. For example, the existing resource allocation may indicate specific discrete resources (e.g., processor cores, memory modules) allocated to the hard provisioned virtual machines. In such cases, these descriptions may be used with a lookup table to identify the allocated quantity of processing resources and quantity of memory resources. The lookup table may relate these quantities.

When performing comparisons to identify inefficiencies, multiple sub-comparisons may be used to compare quantities of similar types of computing resources. The sub-comparison may then be aggregated together.

If multiple resource consumption estimates are obtained and they indicate different consumptions, then inefficiencies corresponding to the different consumption rates may be identified. For example, a first provisional resource inefficiency based on the first resource consumption estimate may be identified (e.g., through comparison), and a second provisional resource inefficiency based on the second resource consumption estimate may also be identified (e.g., through comparison). An aggregate resource inefficiency may then be obtained using the separate inefficiencies (e.g., through averaging or other means).

If an inefficacy is identified, then it may be determined that the resource utilization levels exceed the thresholds.

If it is determined that the resource utilization levels exceed the thresholds, then the method may proceed to operation 324. Otherwise, the method may return to operation 300. Returning to operation 300 may indicate that it is believed that the hard provisioned virtual machine is neither over or under provisioned.

At operation 324, a provisional resource allocation for the hard provisioned virtual machine is obtained based on the resource utilization levels.

In an embodiment, the provisional resource allocation is obtained by incrementing or decrementing the hardware resources allocated to the hard provisioned virtual machine. The hardware resources may be incremented or decremented depending on whether the inefficiency indicates that too little or too many hardware resources are allocated to the hard provisioned virtual machine.

At operation 326, it is determined whether hardware resources are available to support the provisional hardware resource allocation.

The determination may be made, for example, by identifying the unallocated hardware resources and comparing that to any reservations (e.g., for dynamic allocation, so cannot be allocated or reserved for other purposes) to identify an allocable quantity of the hardware resources. If the allocable resources are greater than the incremental change in hardware resources indicated by the provisional hardware resource allocation, then it may be determined that hardware resources are available to support the provisional allocation.

If hardware resources are available to support the provisional resource allocation, then the method may proceed to operation 328. Otherwise, the method may return to operation 300. If the method returns to operation 300, it may be concluded that insufficient allocable resources are available.

At operation 328, the provisional resource allocation is promoted to the new resource allocation. In other words, the provisional resource allocation may be treated as being able to be implemented.

The method may end following operation 328.

Using the method illustrated in FIG. 3C, inefficiencies in resources allocation may be identified and resources allocations to address the inefficiencies may be obtained.

Turning to FIG. 3D, a flow diagram illustrating a method of remediating resource inefficiencies in accordance with an embodiment is shown. The method may be performed by a data processing system, portions thereof, or another entity.

At operation 340, one or more actions based on the resource inefficacies and the new resource allocation are identified. The actions may be identified based on policies keyed to the resource inefficiencies, level of agreement between resource consumption estimates, new resource allocation, and/or other factors. Any number of actions may be identified. For example, the policies may specify when actions are to be performed (e.g., immediately, in the future), and the type of actions. The policies may be maintained, for example, in a lookup table or other data structures that allows for the actions to be identified.

At operation 342, an action set is performed based on the actions to modify operation of the data processing system.

In an embodiment, the action set includes provisioning resources of a data processing system for exclusive use by the hard provisioned virtual machine based on the new resource allocation (e.g., via shut down, provision, and restart), scheduling provisioning of resources of a data processing system for exclusive use by the hard provisioned virtual machine based on the new resource allocation (e.g., during a next startup), and/or modifying resources of a data processing system for exclusive use by the hard provisioned virtual machine while the hard provisioned virtual machine continues execution (e.g., via hot swap). Any of these actions may be performed, for example, when resource consumption estimates are in agreement (or only one is obtained).

If resource consumption estimates are in disagreement, then other actions such as notifications of administrators, scheduling of provisioning in the future subject to ratification or termination by the administrator, and/or other actions that may involve additional actors/management entities may be performed.

In an embodiment, the hard provisioned virtual machine is provisioned by sending instructions to the hypervisor, which may allocate resource to or away from the hard provisioned virtual machine based on the instructions.

The method may end following operation 342.

Figure 4A:
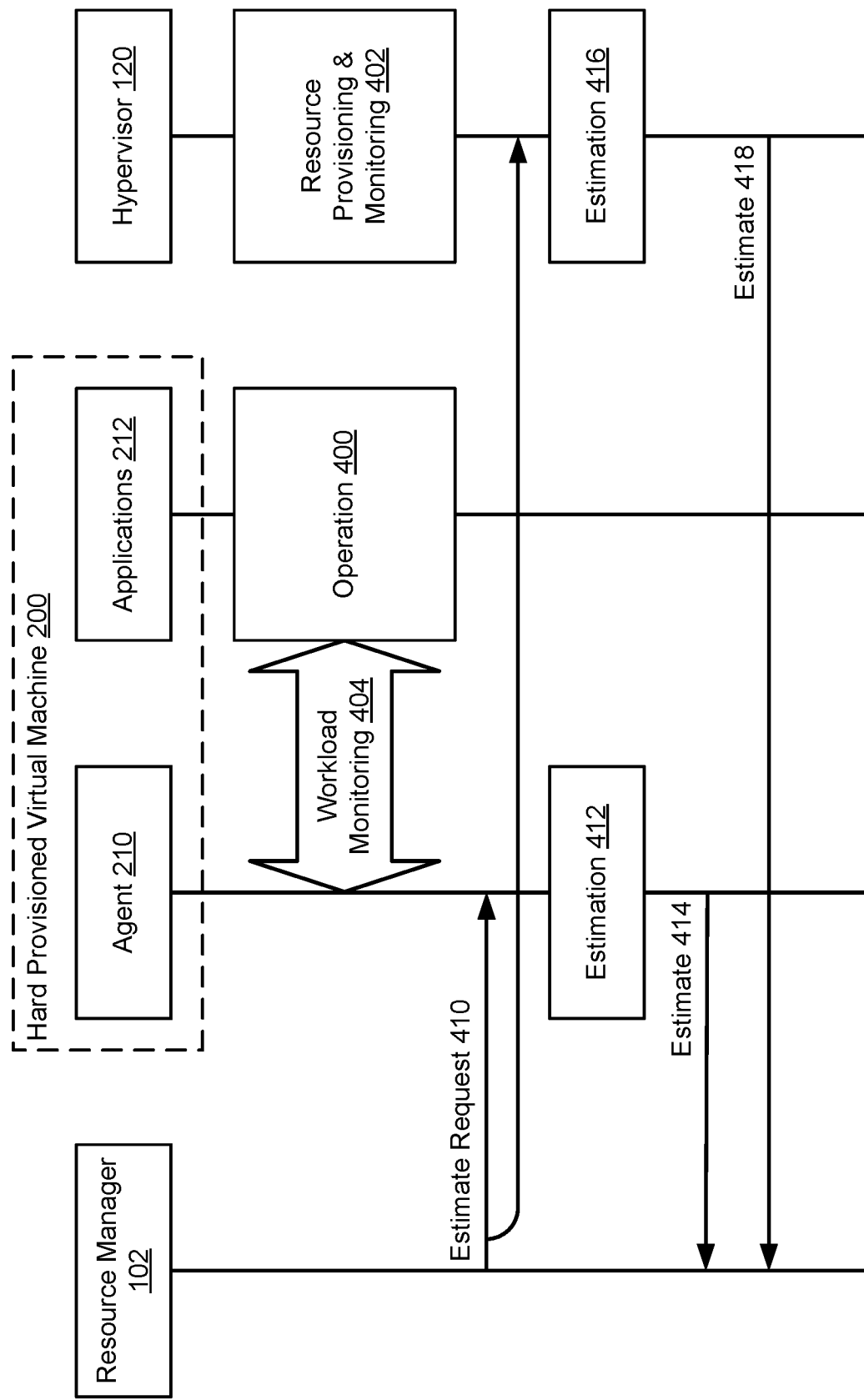
FIGS. 4A-4C show diagrams illustrating actions performed by and/or interactions between components of a system in accordance with an embodiment.
Figure 4B:
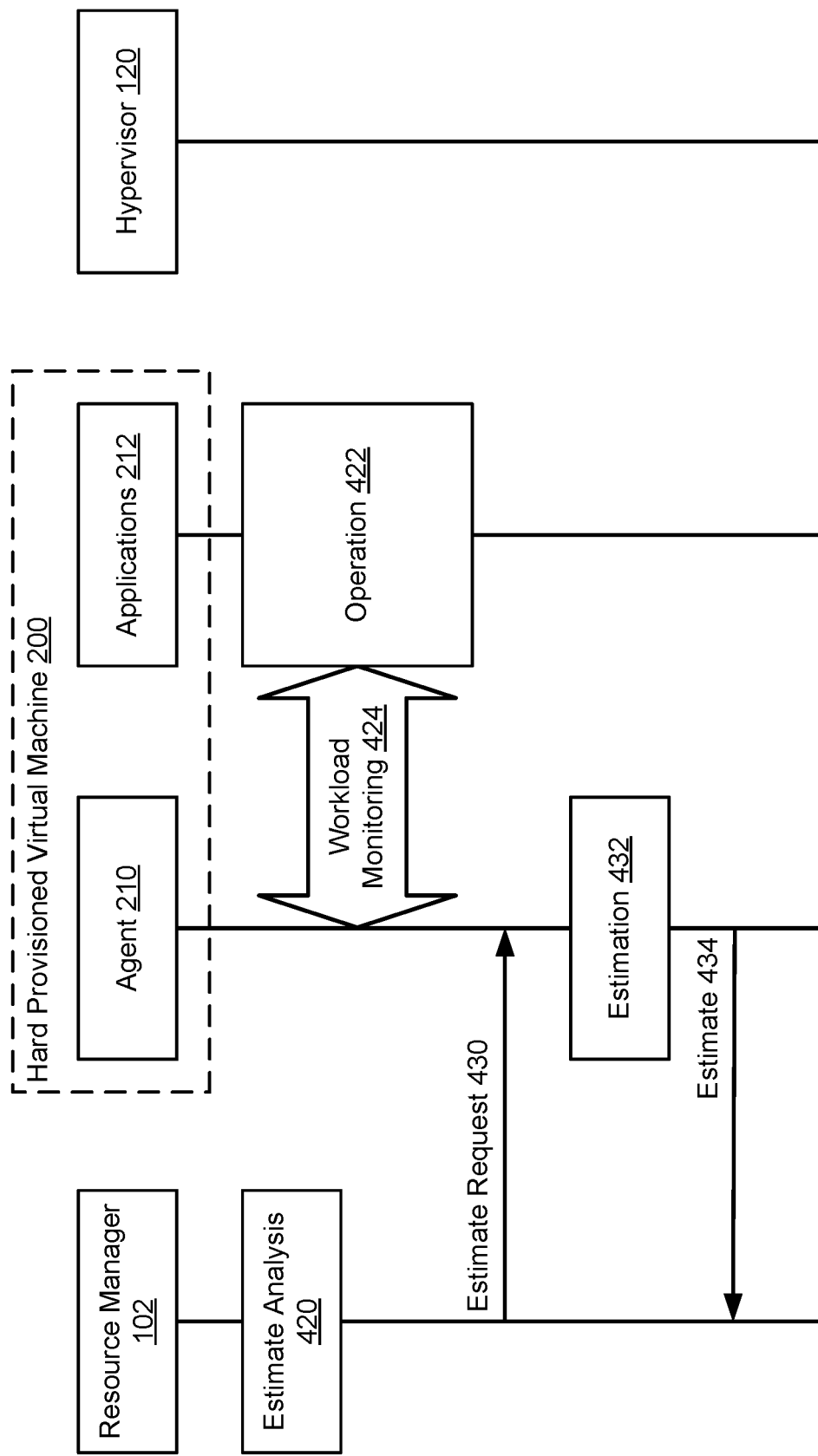
Figure 4C:
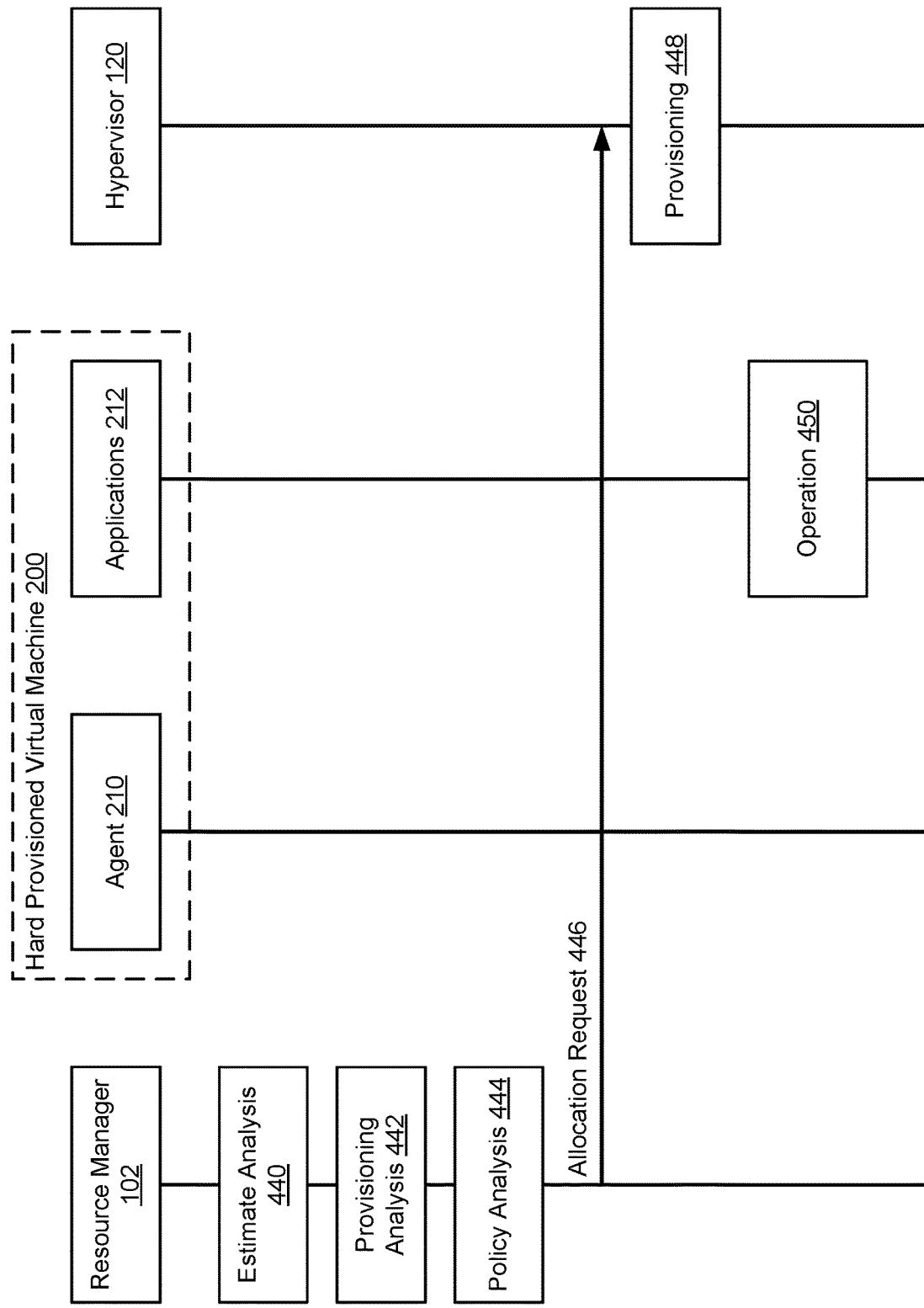

To further clarify embodiments disclosed herein, now consider an example scenario in which a hard provisioned virtual machine hosts a database used for storing commercial transactions for a business. Initially, the business's sales may be low placing little load on the hard provisioned virtual machine. However, a viral video highlighting some of the products that the business sales may dramatically increase the load on the hard provisioned virtual machine. However, due to the operation of the database which polls for new work when idle, the computing resources consumed by the virtual machine has changed very little from the perspective a hypervisor. Turning to FIGS. 4A-4C, diagrams illustrating actions that may be performed by components of a system similar to that of FIG. 1 in accordance with an embodiment is shown. The system in FIGS. 4A-4C may include hard provisioned virtual machine 200 that, following the above example, hosts the database impacted by the viral video. In FIGS. 4A-4C, actions performed by various components and interactions between components (e.g., data transmissions) are shown. The actions performed by the respective components are shown with boxes in alignment with the line descending from the box representing the respective component of the system. Interactions between components are illustrated with arrows interconnecting the lines descending from the boxes. Generally, the actions and interactions are ordered as may be performed in a temporal order with earlier actions/interactions being towards the top of the page and later performed actions/interactions being towards the bottom of the page. The actions/interactions may be performed in other orders.

To facilitate accurate determination of the resource consumption by hard provisioned virtual machine 200, agent 210 may monitor operation 400 of applications 212, including the database. To do so, agent 210 may perform workload monitoring 404 thereby identifying productive and unproductive operation. Similarly, hypervisor 120 may perform resource provisioning and monitor 402 so that hard provisioned virtual machine 200 may have access to provisioned hardware resources and virtual machine level use of computing resources may also be monitored.

Resource manager 102 may, to manage provisioning of hard provisioned virtual machine 200, send estimate request 410 to both agent 210 and hypervisor 120. In response, agent 210 and hypervisor 120 may perform estimations 412, 416 to obtain respective estimates 414, 418. Agent 210 and hypervisor 120 may send these estimates 414, 418 to resources manager 102 to satisfy the estimate requests 410.

Turning to FIB 4B, upon receipt of these estimates 414, 418, resource manager 102 may compare them to a duration threshold (e.g., a duration over which computing resource consumption must be known before provisioning of a hard provisioned virtual machine may be considered) that it has established. Due to the fast change in workload, the duration threshold is not met. Accordingly, no inefficiencies or new resource allocations are identified.

As time passes, agent 210 and the database continue in operation 422 and performing workload monitoring 424 for operation 422. Consequently, when resource manager 102 sends estimate request 430, agent 210 may be able to perform estimation 432 for a different period of time (e.g., following its previous estimation), thereby generating and providing estimate 434 to resource manager 102. For brevity, similar operation may be performed with respect to hypervisor 120 but are not illustrated.

Turning to FIG. 4C, using both estimates, resource manager 102 identifies that it now has sufficient resource consumption estimates to meet the duration threshold. Accordingly, resource manager 102 proceeds to perform estimate analysis 440 through which it is able to identify that hard provisioned virtual machine 200 is provisioned with insufficient processing hardware resources. Resource manager 102 performs provisioning analysis 442 to identify a new resource allocation for hard provisioned virtual machine 200 by incrementing the number of processor cores allocated to it.

Resource manager 102 then performs policy analysis 444 to identify the actions that are to be performed. In this case, the resource consumption estimates from agent 210 and hypervisor 120 were in agreement (both indicated all of the available resources were being consumed). Consequently, policy analysis 444 indicates that an immediate reallocation action is to be performed.

Based on the identified reallocation action, resource manager 102 sends allocation request 446 to hypervisor 120. In response and based on allocation request 446, hypervisor 120 performs provisioning 448 for hard provisioned virtual machine 200 thereby allocating an additional processor cores for exclusive use by hard provisioned virtual machine 200.

Accordingly, after provisioning 448, operation 450 by applications 212 of hard provisioned virtual machine is not hampered due to lack of available hardware resources.

Thus, as illustrated in FIGS. 4A-4C, hard provisioned virtual machines may be dynamically provisioned in an automated manner that is likely to reduce both under and over provisioning. Accordingly, the efficiency of hardware resources use may be improved.

Figure 5:
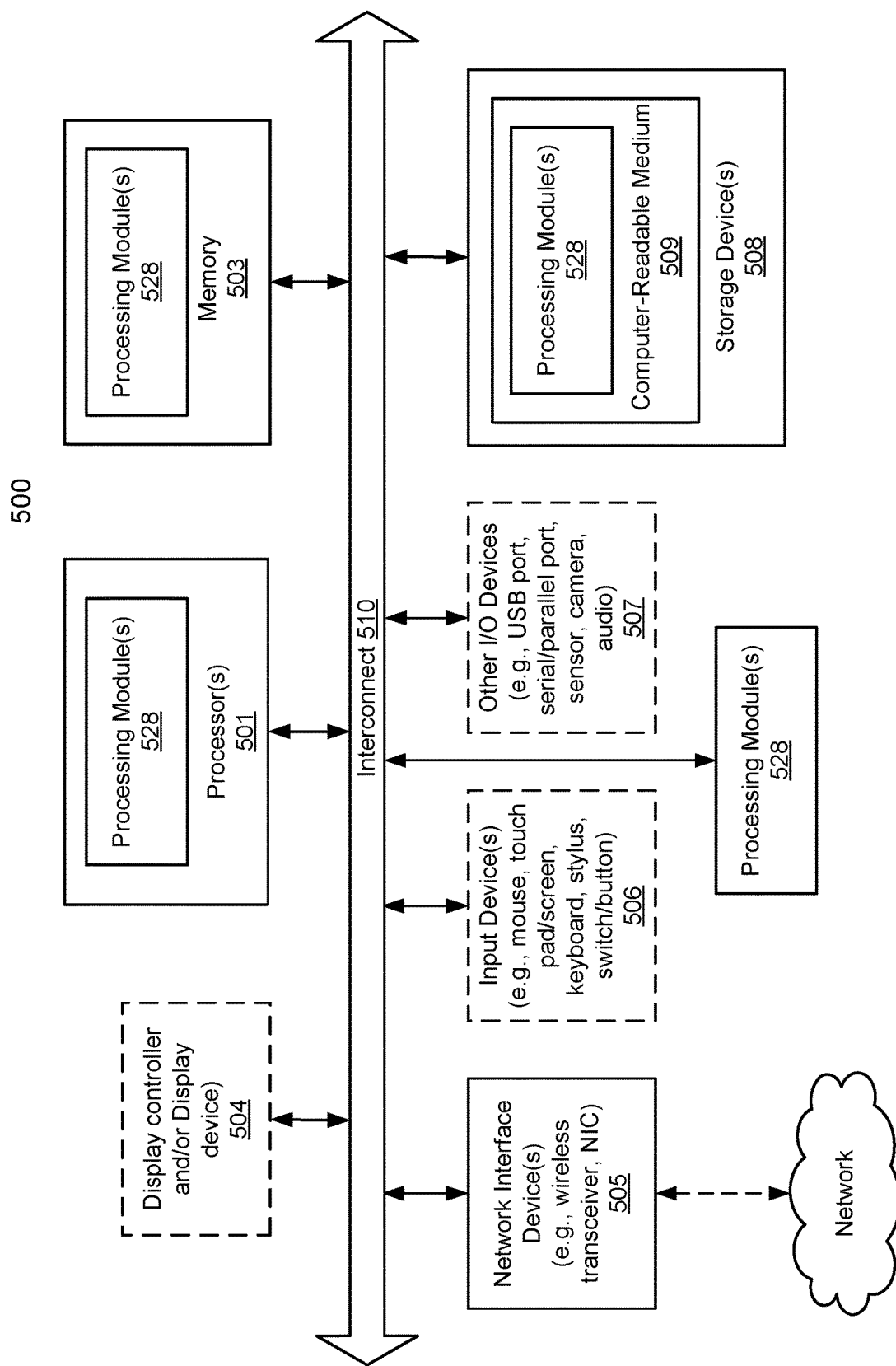
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like.

More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing resources allocated to virtual machines, the method comprising:
 obtaining a first resource consumption estimate for a hard provisioned virtual machine of the virtual machines, the first resource consumption estimate being obtained from a hypervisor that manages resource provisioning for the hard provisioned virtual machine;
 obtaining a second resource consumption estimate for a hard provisioned virtual machine of the virtual machines, the second resource consumption estimate being obtained from an agent hosted by the hard provisioned virtual machine;
 identifying:
  a resource inefficiency for the hard provisioned virtual machine based on the first resource consumption estimate and the second resource consumption estimate, and
  a new resource allocation based on the resource inefficiency; and
 remediating the identified resource inefficiency using the new resource allocation.

2. The computer-implemented method of claim 1, wherein obtaining the second resource consumption estimate comprises:
 obtaining workload characteristics of workloads performed by the hard provisioned virtual machines;
 classifying the workloads based on the workload characteristics;
 calculating a reduction factor based on the workload classifications; and
 reducing a quantity of computing resources alleged to be used by the hard provisioned virtual machine by the reduction factor to obtain the second resource consumption estimate.

3. The computer-implemented method of claim 2, wherein the workloads are classified based on a productivity level of the workloads.

4. The computer-implemented method of claim 3, wherein the productivity level of each of the workloads is based on a ratio of polling behavior by a respective workload and non-polling behavior by the respective workload.

5. The computer-implemented method of claim 4, wherein the polling behavior corresponds to acts of the workload inquiring regarding whether actions should be performed by the hard provisioned virtual machine.

6. The computer-implemented method of claim 1, wherein identifying the resource inefficiency comprises:

making a determination that the first resource consumption estimate and the second resource consumption estimate are different;
based on the determination:
identifying a first provisional resource inefficiency based on the first resource consumption estimate, and
identifying a second provisional resource inefficiency based on the second resource consumption estimate; and
obtaining the resource inefficiency using the first provisional resource inefficiency and the second provisional resource inefficiency.

7. The computer-implemented method of claim 1, wherein remediating the identified resource inefficiency comprises:
making a determination that the first resource consumption estimate and the second resource consumption estimate are different; and
based on the determination:
requesting authorization to modify a resource allocation for the hard provisioned virtual machine based on the new resource allocation.

8. The computer-implemented method of claim 1, wherein remediating the identified resource inefficiency comprises:
making a determination that the first resource consumption estimate and the second resource consumption estimate are similar; and
based on the determination:
provisioning the hard provisioned virtual machine based on the new resource allocation.

9. The computer-implemented method of claim 1, wherein the virtual machines are hosted by a data processing system, and the virtual machines comprise a soft provisioned virtual machine which utilizes, at least in part, shared resources of the data processing system, and the hard provisioned virtual machine has exclusive use of a portion of resources of the data processing system.

10. The computer-implemented method of claim 1, wherein the first resource consumption estimate is based on resources consumed by the hard provisioned virtual machine for any action, and the second resource consumption estimate is based on resources consumed by the hard provisioned virtual machine for only productive actions.

11. A non-transitory machine-readable medium having instructions stored therein, which when executed by a processor, cause the processor to perform operations for managing resources allocated to virtual machines, the operations comprising:
obtaining a first resource consumption estimate for a hard provisioned virtual machine of the virtual machines, the first resource consumption estimate being obtained from a hypervisor that manages resource provisioning for the hard provisioned virtual machine;
obtaining a second resource consumption estimate for a hard provisioned virtual machine of the virtual machines, the second resource consumption estimate being obtained from an agent hosted by the hard provisioned virtual machine;
identifying:
a resource inefficiency for the hard provisioned virtual machine based on the first resource consumption estimate and the second resource consumption estimate, and
a new resource allocation based on the resource inefficiency; and
remediating the identified resource inefficiency using the new resource allocation.

12. The non-transitory machine-readable medium of claim 11, wherein obtaining the second resource consumption estimate comprises:
obtaining workload characteristics of workloads performed by the hard provisioned virtual machines;
classifying the workloads based on the workload characteristics;
calculating a reduction factor based on the workload classifications; and
reducing a quantity of computing resources alleged to be used by the hard provisioned virtual machine by the reduction factor to obtain the second resource consumption estimate.

13. The non-transitory machine-readable medium of claim 12, wherein workloads are classified based on a productivity level of the workloads.

14. The non-transitory machine-readable medium of claim 13, wherein the productivity level of each of the workloads is based on a ratio of polling behavior by a respective workload and non-polling behavior by the respective workload.

15. The non-transitory machine-readable medium of claim 14, wherein the polling behavior corresponds to acts of the workload inquiring regarding whether actions should be performed by the hard provisioned virtual machine.

16. A data processing system, comprising:
a processor; and
a memory coupled to the processor to store instructions, which when executed by the processor, cause the processor to perform operations for managing resources allocated to virtual machines, the operations comprising:
obtaining a first resource consumption estimate for a hard provisioned virtual machine of the virtual machines, the first resource consumption estimate being obtained from a hypervisor that manages resource provisioning for the hard provisioned virtual machine;
obtaining a second resource consumption estimate for a hard provisioned virtual machine of the virtual machines, the second resource consumption estimate being obtained from an agent hosted by the hard provisioned virtual machine;
identifying:
a resource inefficiency for the hard provisioned virtual machine based on the first resource consumption estimate and the second resource consumption estimate, and
a new resource allocation based on the resource inefficiency; and
remediating the identified resource inefficiency using the new resource allocation.

17. The data processing system of claim 16, wherein obtaining the second resource consumption estimate comprises:
obtaining workload characteristics of workloads performed by the hard provisioned virtual machines;
classifying the workloads based on the workload characteristics;
calculating a reduction factor based on the workload classifications; and
reducing a quantity of computing resources alleged to be used by the hard provisioned virtual machine by the reduction factor to obtain the second resource consumption estimate.

18. The data processing system of claim 17, wherein workloads are classified based on a productivity level of the workloads.

19. The data processing system of claim 18, wherein the productivity level of each of the workloads is based on a ratio of polling behavior by a respective workload and non-polling behavior by the respective workload.

20. The data processing system of claim 19, wherein the polling behavior corresponds to acts of the workload inquiring regarding whether actions should be performed by the hard provisioned virtual machine.

* * * * *